3,164,487
METHODS OF PRODUCING CARBON-IMPREGNATED ARTEFACTS
Kenneth Wallace Carley-Macauly, Harwell, and Malcolm MacKenzie, Wantage, England, assignors to United Kingdom Atomic Energy Authority, London, England
Filed Apr. 21, 1961, Ser. No. 104,670
Claims priority, application Great Britain, Apr. 26, 1960, 14,665/60; Nov. 29, 1960, 40,903/60
17 Claims. (Cl. 117—46)

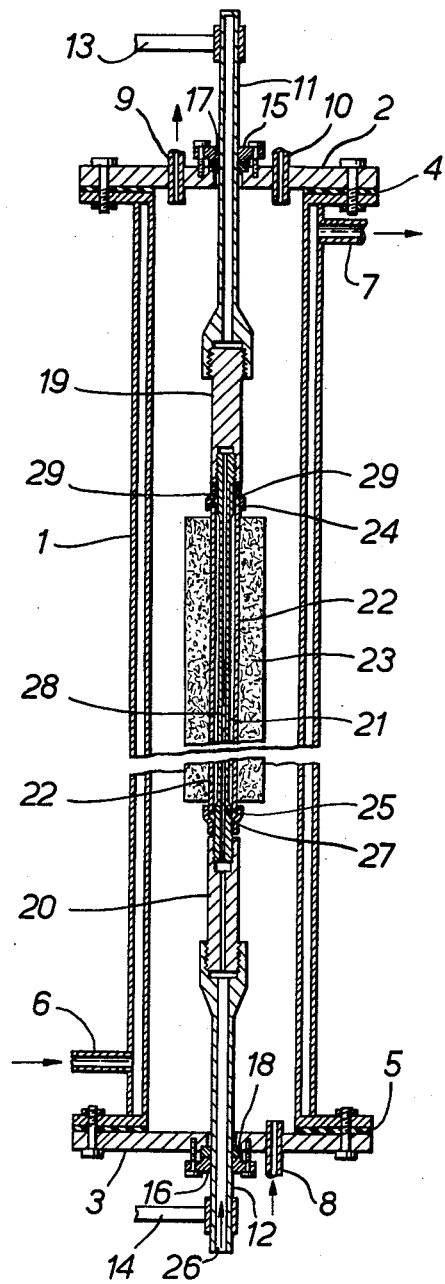

The invention relates to methods of producing carbon-impregnated artefacts. It is particularly concerned with the production of carbon-impregnated artefacts having a very low permeability to gases, and is also concerned with the produciton of such artefacts which embody a proportion of a fissile or fertile material, e.g. uranium, thorium, or compounds thereof, for use in reactor fuel elements. Fissile or fertile material is hereinafter referred to as nuclear fuel material.

According to the invention an artefact of high open porosity and low thermal conductivity is arranged in an atmosphere of hydrocarbon gas, an initial zone of the artefact is heated to a temperature within a range in which carbon is deposited from gas permeating the artefact to impregnate fully the initial zone and the temperature of this impregnated zone is then raised progressively to maintain said temperature within an advancing impregnated/non-impregnated boundary zone, the rate of rise of temperature in the initial zone being limited so that the advancing boundary zone is fully impregnated.

A desirable property of the artefact besides high open porosity and low thermal conductivity, is a large internal surface area. These are often concomitant properties, especially in non-consolidated materials. Open porosity gives good access for the gas, large surface area enhances rates of carbon deposition and low thermal conductivity enables a steep temperature gradient to be established within the artefact. To enhance the steepness of this gradient a surface of the artefact remote from the initial zone may be cooled artificially.

A convenient method of increasing the temperature of the initial zone and thus advancing the zone of deposition, is to control the heat supplied to the initial zone. The heat supplied to increase the temperature then compensates for the increasing thickness and thus thermal resistance of the impregnated zone and enables the required reaction temperature to be maintained at the advancing cooler boundary of the impregnated zone. If the rate of increase of heat supplied is too great, however, compared with the rate at which hydrocarbon gas can permeate the artefact to reach the boundary of the impregnated zone, higher temperatures will spread into the unimpregnated parts and substantial deposition will occur there prematurely; the advancing boundary zone will then not be fully impregnated, thus giving an incompletely impregnated final artefact. The geometry of the artefact will largely influence the rate at which the heat input will require to be varied to maintain the required temperature at the advancing boundary zone since this zone may, for example, be increasing in area.

Whether control is effected by using a schedule of power rise, or by controlling the temperature of the initial zone, or by some other means such as measurement of electrical resistance, a number of trials will generally be necessary before the best conditions are found to obtain a uniformly impregnated artefact, for a given type and thickness of artefact, and given hydrocarbon gas, pressure, etc.

We have found that a carbon impregnated artefact produced by this method has an extremely low permeability to gases, and moreover is substantially more isotropic in properties than artefacts consisting entirely of, or coated with, carbon produced by deposition pyrolytically from a hydrocarbon gas, due to the random orientation of the carbon crystallites deposited within the pores of the artefact.

Heating of the initial zone of the artefact may be achieved by direct contact with a heated element or by radiation from a heated element. The element may be heated by the resistive heating of an electric current passing through it, or by other means. When it is heated by passage of an electric current through it, good results are achieved by direct contact between the element and the artefact, but it is preferred to avoid such contact and to heat the mass by radiation from the element, since contact between the element and the artefact will cause current to flow through the artefact, and in particular through the zone in which carbon has been deposited from the hydrocarbon gas, which will have a higher electrical conductivity than the remainder of the artefact. Such flow of current through the artefact will lead to a greater consumption of power during the process.

On the other hand, when treating a mass of particles (themselves partially conducting) this may prove an advantage by creating hot spots at the junctions between particles and promoting deposition where it is most required.

Suitable artefacts consist of carbon masses of high open porosity. Similar masses, in which part of the carbon is replaced by other materials may also be used, e.g. mixtures of carbon and nuclear fuel materials, which will provide, when treated by the method of the invention, artefacts suitable for use in nuclear fuel elements. Other porous artefacts which may be used may consist of ceramic materials such as porous alumina or silica.

Suitable carbon masses of high open porosity include masses of very fine carbon particles such as carbon black (which may be pre-granulated), carbonised layers of cellulose fabric such as cotton or rayon fabric, and carbonized masses of cellulose fibres such as cotton wool. Loosely packed carbon black may have a density of about 0.5 gm./cc.; carbon black hydrostatically pressed to give a coherent mass may have a density of about 0.9 gm./cc.; carbonised layers of cotton or rayon fabric may have a bulk density of about 0.2 gm./cc.; carbonised masses of cotton wool may have a bulk density of about 0.08 gm./cc. Since the theoretical density of non-porous carbon is about 2.2 gm./cc., such materials have an open porosity amounting to at least 60% of their volume and are suitable for use in the present invention.

By open porosity is meant that proportion of the volume of the carbon mass which is open to penetration by gases.

Artefacts comprising nuclear fuel material may be produced by admixing particles of nuclear fuel material with particles of pure carbon. The admixed fuel particles may be particles of the appropriate metal or carbide which have already been coated with carbon. One process for producing such coated particles is described in the specification of British Patent No. 878,927, corresponding U.S. application No. 18,506, filed March 30, 1960 wherein uranium metal particles are first converted to uranium carbide by heating in an hydrocarbon gas, preferably propane, and then coated with carbon by raising the temperature so that carbon is pyrolytically deposited from the propane on to the carbide particles.

Alternatively the admixed particles of fuel material may be uncoated particles of the metal, or of its oxide, carbide or other compound. If the fuel material is other than the carbide, the carbide may be formed by heating the artefact to a suitable temperature after impregnation, or preferably by heating the admixture before impregnation. (Conversion to the carbide is optional, but will usually be desirable to ensure stability of the final artefact when heated in a reactor.)

The proportion of pure carbon particles and particles of fuel material in the artefact may be adjusted according to the final composition desired. An artefact rich in fuel material may consist entirely or almost entirely of particles of fuel material without any pure carbon particles, although if the fuel particles are of uncoated metal the higher thermal conductivity of the resulting artefact may have to be taken into account in carrying out the process.

Artefacts comprising particles of fuel material may be impregnated as a mixture of powders or may be preformed into larger granules, e.g. by compacting with or without a suitable binder followed by crushing. This preliminary granulation facilitates the escape of reaction gases and prevents cracking of the artefacts.

As a further alternative the fuel particles can be incorporated amongst the fibres of a cellulose material, e.g. cotton wool or cloth, the whole baked, and then impregnated with carbon by the method of the invention.

The impregnation process, together with any preliminary heating process for converting the fuel material to carbide, may be performed in the same apparatus, of the kind which will be described hereafter.

The present invention enables fuel element artefacts to be made which are substantialy impermeable, have no fuel material in their outer layers, and from which fission product escape, even by recoil, is minimised.

The present process may also be used to impregnate artefacts which contain neither carbon nor fuel material, e.g. a porous silica artefact, in which case the silica may be converted to silicon carbide and an impermeable artefact of silicon carbide produced.

The artefact of high open porosity may for example be in the form of a sheet, tube, or other body having two opposed surfaces. The carbon-impregnated artefacts produced by the process of this invention will have substantially the same shape and dimensions as the original artefact, but other shapes such as rods may be cut or machined from such artefacts. If desired artefacts comprising carbon before impregnation may be converted to graphite by heating to graphitising temperature, e.g. 2700° C., which has the advantage of making machining of the artefacts easier.

When the artefact is in the form of a tube, the initial zone (i.e. the zone which is initially heated to the high temperature) may either be a thin layer adjacent the inner surface of the tube, in which case the hydrocarbon gas may be supplied to the outer surface, or be a thin layer adjacent the outer surface of the tube, in which case the gas may be supplied to the inner surface. In the latter case, it will be convenient to cool the inner surface by means of a fluid passing through a concentric inner tube, and to heat the outer surface by placing the artefact in a conventional electric furnace. In the former case, it will be convenient to heat the inner surface by an electrical current-carrying element passing concentrically through the artefact, and to cool the outer surface either by natural radiative cooling or by cooling means surrounding the artefact.

When the artefact is in the form of a sheet, two of such sheets may be placed on either side of a central element, the inner surface of each sheet heated by passing an electric current through the element, and hydrocarbon gas supplied to the outer surfaces of the artefact.

When the artefact to be impregnated has conveniently opposed surfaces the invention comprises heating a first surface to a high temperature, supplying hydrocarbon gas to a second surface, the said high temperature being sufficient to cause deposition of carbon from the hydrocarbon gas in a thin zone adjacent to the first surface at a rate compatible with that at which hydrocarbon gas can reach this surface but not sufficient to cause substantial deposition of carbon elsewhere in the artefact; and raising the temperature of the first surface at a rate sufficient to cause the spread of the zone of substantial deposition towards the second surface, and compatible with that at which gas can, at every stage, reach this zone and decompose to fill substantially all the pores in the artefact with carbon.

Suitable carbon masses of high open porosity may be produced by forming a layer of cellulosic material, such as cotton or rayon fabric or cotton wool, on a former, which may be the heating element itself, or a metal or carbon former, e.g. a tube of graphite or carbonised cardboard, and then heating the assembly to a carbonising temperature. A suitable carbonising temperature for cellulosic materials is 800° C. or higher temperatures if an initially purer carbon is required as base material.

Alternatively, a suitable carbon mass could be produced by deposition of carbon black from a hydrocarbon gas onto a porous screen, by passing the gas through the screen and heating it to a temperature at which gas-phase carbonisation of the hydrocarbon gas occurs.

During the process of the invention, artefacts comprising carbon or other oxidisable materials must not be exposed to oxidising gases at high temperatures. It is necessary in such cases to remove air from the pores of the artefact by evacuation before starting the process, and to ensure that no oxidising gas reaches the artefact thereafter. When the heating element is not in contact with the artefact, an inert gas such as argon may be supplied to the space between it and the element.

Suitable hydrocarbon gases for use in the process of this invention include the lower paraffins and olefins, such as methane, ethane, propane, butane, ethylene, propylene and butylene, which are gases at normal temperatures and pressures, and the vapours of the lower aromatic hydrocarbons such as benzene and toluene. The paraffinic and aromatic hydrocarbons are preferred, since they are less likely to polymerise and give rise to deposition in unwanted places than the olefinic hydrocarbons.

It has been found, however, that to obtain the lowest permeabilities in artefacts in which carbon is converted to graphite by heating to graphitising temperatures after impregnation, it is preferred to use methane, since artefacts impregnated by deposition of carbon from higher hydrocarbons generally give an increase in permeability on graphitising. This is probably due to hydrogen present in the deposited carbon, the temperature of deposition being considerably lower for hydrocarbons other than methane than for methane itself. However, the other hydrocarbons may be used when it is not required to produce material of such extreme impermeability, and such use enables the production of greater thicknesses of impregnated artefact and greater reproducibility. The lower paraffins and olefins are satisfactory at atmospheric and elevated pressures, but give rather poorer results at sub-atmospheric pressure. Benzene on the other hand can best be used at reduced pressures because at atmospheric pressure the carbon deposited from it may spall in situ during the process (probably due to hydrogen content). With methane and other gases an advantage in faster operation may be obtained by the use of elevated pressures. When methane is used, it may be diluted with hydrogen, and the rate of supply of methane should be about three to four times the rate of conversion to carbon, which may vary during the process.

The temperature at which substantial deposition of carbon occurs is different for each gas or vapour, as is the temperature at which substantial gas-phase carbonisation occurs. It is not necessary, however, to know these temperatures exactly, because the method of operation involves control of the heat supply in accordance with a schedule which automatically brings the temperature of the initial zone up to that at which the deposition reaction occurs and then, by limiting the rate of advance of the boundary zone, controls the rate at which this deposition can occur. A schedule is selected such that the supply of gas by diffusion is sufficient for full impregnation of the boundary zone. Too fast a schedule will lead to an advance of the boundary zone before adequate deposition has occurred and consequently an incompletely impregnated artefact. Too slow a rate of heating is also undersirable for economic reasons, and it has been found useful to carry out analyses of the exit gases in helping to maintain a good level of hydrocarbon consumption.

Practical schedules of heat supplied will generally be in the range of 0.003 to 0.0002 watt per second per square centimetre of the advancing boundary zone, depending on the composition of the artefact, its geometry and the impregnating gas conditions.

The nature of the invention and the manner in which it is to be performed will be made more apparent by the following examples, in which specific embodiments of the invention are described.

Example I

A porous artefact consisting of carbon particles, 20 cm. long and 1.2 cm. thick, was formed around a tubular graphite element having an outside diameter of 0.8 cm., by loosely packing carbon black of "medium thermal" grade between the element and a stainless steel gauze cylinder 3.2 cm. in diameter. This carbon black had a mean particle size of 1 micron and the artefact had a density of about 0.5 gm./cc. representing a porosity of about 75%. The assembly was then placed centrally in a stainless steel, water-cooled pressure vessel tube of internal diameter 3.8 cm., and evacuated to remove air. Propylene gas was then admitted at 100 p.s.i. (7 kg./sq. cm.) and power was supplied to the element to raise its centre temperature to 950° C., which required a current of 50 amps at 3 volts, i.e. a power of 150 watts. Propylene gas was fed in at the rate of about 0.01 cu. ft. (300 cc.) per second while the power supplied to the element was raised gradually over a period of 5 hours to about 2 kilowatts, at which the centre temperature reached 1120° C. In order to ensure that the rate of advance of the boundary zone, in which deposition occurred, was not too rapid, the rate of increase of power was limited to to 20 watts every 5 minutes in the first hour, 30 watts every 5 minutes in the next 2 hours, and 40 watts every 5 minutes in the last 2 hours. At the end of the 5 hours, the power was reduced to zero over 10 minutes to avoid thermal shock and the apparatus allowed to cool slowly before removing the assembly of element and carbon bed. The artefact was found to be fully impregnated with carbon deposited from the propylene gas and had a density of 1.8 gm./cc. measured by mercury displacement.

Example II

A porous artefact consisting of carbon particles, 15 cm. long and 0.6 cm. thick, was formed around a solid cylindrical graphite element 0.6 cm. in diameter, by hydrostatically pressing carbon black similar to that used in Example I to a diameter of 1.8 cm. around the element at a pressure of 14 tons/sq. in. (2,200 kg./sq. cm.) The artefact so formed had a density of about 0.9 gm./cc., representing a porosity of about 60%, and was coherent, requiring no gauze retaining means. The assembly was placed in a pressure vessel tube and evacuated, as in Example I, and then propane gas was admitted at 120 p.s.i. (8.4 kg./sq. cm.). Power was supplied to the element to raise its centre temperature at 840° C., which require a current of 60 amps. at 4.1 volts i.e. a power of about 250 watts. Propane gas was fed in at the rate of about 0.01 cu. ft. (300 cc.) per second, while the rate of increase of power was limited to 20 watts every 5 minutes for 3 hours and 10 minutes, reaching a final power of about 1 kilowatt, in order to ensure that the boundary zone did not advance too rapidly. After cooling as in Example I, the carbon bed was found to be fully impregnated and had a mean density of 1.72 gm./cc. rising to a maximum of 1.75 gm./cc. in an inner zone adjacent to the heating element.

Example III

A porous carbon artefact, 25 cm. long and about 4 mm. thick, was formed around a tubular graphite element identical with that used in Example I, by wrapping butter muslin around the element to a thickness of about 6 mm. binding it with string to prevent it unwrapping, and baking the assembly in an electric furnace at 800° C. in an argon atmosphere. The string fell away from the muslin during carbonisation. The assembly was then placed in a vacuum vessel and evacuated to remove air. Purified methane was then admitted at an absolute pressure of 30 cm. of mercury (0.41 kc./sq. cm.). Power was supplied to the element to raise its centre temperature to 1200° C., measured pyrometrically by viewing down the centre of the tubular element a plug across the middle of the element. Methane was fed in at the rate of about 60 cc. per second, while the centre temperature of the element was raised gradually over 6 hours to 1310° C., the rate of temperature rise being limited to ensure that the boundary zone did not advance too rapidly. The maximum power reached at the end of this period was about 3.3 kilowatts. After cooling as in Example I, the artefact was found to be fully impregnated to a distance of 2.5 mm. from the heating element. The impregnated artefact was then graphitised by heating the assembly to 2700° C. in an argon atmosphere.

The graphitised product of Example III was found to have a mean density of 1.42 gm./cc., the density of the fully impregnated zone being 1.57 gm./cc. After machining away the tubular heating element, the permeability of the remaining tube to argon was found to be only $10^{-6}$ cm.$^2$ sec.$^{-1}$. After machining away a further 1 mm. from the inside of the tube this was only increased by a factor of 2.

Example IV

A porous carbon artefact, 25 cm. long and about 5 mm. thick, was formed around a tubular graphite element identical with that used in Examples I and II, by wrapping dry cotton wool around the element and binding it with string. The layer of cotton wool thus formed was about 9 mm. thick. The assembly was then baked in an electric furnace at 800° C., in an argon atmosphere, the string falling away during carbonisation. The assembly was then placed in a vacuum vessel and evacuated to remove air. Purified methane was then admitted at an absolute pressure of 30 cm. of mercury (0.41 kg./sq. cm.). Power was supplied to the element to raise its centre temperature to 1200° C., methane was fed in and the centre temperature raised as in Example III but over a period of 12 hours instead of 6 hours. The maximum power reached at the end of this period was about 3.6 kilowatts. After cooling as in Example I the carbon bed was found to be fully impregnated to a distance of 4 mm. from the heating element and to have a uniform density of 1.6 gm./cc. within the impregnated zone. The impregnated carbon bed was then graphitised by heating the assembly to 2700° C. in an argon atmosphere.

The graphitised product of Example IV was machined out to remove the heating element and 1 mm. of the inside of the remaining tube, and was then found to have a permeability to krypton of only $10^{-10}$ cm.$^2$ sec.$^{-1}$, and the extremely high compressive strength of 37,000 p.s.i. (2,600 kg./sq. cm). For comparison, the compressive strength of graphite of the usual nuclear reactor grades is about 400 p.s.i.

Example V

A cylindrical carbon artefact consisting of carbon granules, 25 cm. long and 29 mm. in diameter, was formed by the following method:

A thermal carbon black of "medium" grade was compacted at 20 tons/in.$^2$ (3160 kg./cm.$^2$) and then broken down and sieved to separate the fraction passing a No. 36 British Standard mesh, but retained on a No. 60 mesh. These granules were used to fill the annular space between the tubular heating element (as used in previous examples) and a carbon gauze of 29 mm. internal diameter. The latter was formed by soaking butter muslin in phenol-formaldehyde resin, forming it into a tube on a former and then baking the cured material at 900° C. The annular space was maintained by means of ceramic formers at the top and bottom. The assembly was then placed in a vacuum vessel, as in Example IV, and slowly evacuated to remove air. Benzene vapour was then admitted until the pressure was 3 cm. of mercury. Power was supplied as in Example IV commencing at 200 watts, and rising at the rate of 20 watts every 10 minutes for 5 hours, 25 watts every 10 minutes for another 2 hours and 50 watts every 15 minutes for a further 7 hours. The maximum power was then 2.5 kilowatts. The impregnated artefact was impregnated uniformly for a thickness of at least 5 mm. outwards from the heating element and had a mean density of 1.8 gm./cc.

A suitable apparatus for carrying out the invention is illustrated in the accompanying drawing which is a vertical section through the centre of the apparatus.

In the drawing a cylindrical, brass, water-cooled vessel 1 has brass end plates 2 and 3. The internal length of the tube is about 90 cm. and its internal diameter about 10 cm. Polytetrafluoroethylene gaskets 4 and 5 seal the ends of the tube. Cooling water for the tube 1 enters at 6 and leaves at 7. The hydrocarbon gas enters at 8 and leaves at 9. A vacuum connection may be provided at 10. Copper electrodes 11 and 12 are connected to a source of power by leads 13 and 14. Heat-resistant clamping bushes 15 and 16, e.g. of "Tufnol" (registered trademark), may by screwed down onto the end plates 2 and 3, sealing the electrodes into the pressure tube by means of rubber rings 17 and 18. Replaceable graphite connecting pieces 19 and 20 are screwed into the ends of the electrodes 11 and 12, and to those are connected a graphite heating element 21. The connecting piece 20, the heating element 21 and the lower electrode 12 are each provided with a central bore, the purpose of which will be explained later.

In the apparatus shown in the drawing the porous artefact for impregnation consists of a porous carbon tube 23 supported on a carbon former 22. The former is held concentrically around the heating element 21 by means of upper and lower collars 24 and 25 of ceramic insulating material, e.g. silica. Inert gas, e.g., argon, is fed in at 26, passes through central bores in the lower electrode 12 and connecting piece 20, and then through apertures 27 in the lower end of the element 21. A central plug 28 in the bore of the element 21 prevents passage of inert gas through the bore of the element, and also provides a surface at the central point of the element which may be viewed from 26 down the bores of the electrode 12, connecting piece 20 and element 21, for estimation of the centre temperature of the element pyrometrically. The inert gas passes through the annular space between the electrode 21 and the carbon former 22 and then passes out through apertures 29 in the upper collar 24, into the hydrocarbon gas and leaves with the latter at 9.

Alternative forms of apparatus are of course possible. For example the porous carbon tube 23 could be supported on a perforated stainless steel tube and surrounded by a stainless steel gauze, the inert gas passed over the outside of the carbon tube and the hydrocarbon gas supplied to the inside of the stainless steel tube, the assembly being heated from the outside by an electric furnace. A cooling tube could pass through the centre of the stainless steel tube. Thus deposition of carbon from the hydrocarbon gas would proceed from the outside of the tube inwards.

The process of the invention can also be applied to the joining and sealing of carbon articles, e.g. a circular lid to a cylindrical box, by forming a porous carbon mass over the surfaces of the parts requiring to be sealed together, arranging that these surfaces be heated to the required temperature, and supplying a hydrocarbon gas to the exposed surfaces of the carbon mass. Heating the surfaces of the parts requiring to be sealed together could be achieved, without heating the remainder of each article to be joined to as high a temperature, by passing an electric current through the articles and arranging that the cross-sectional area is a minimum at the parts requiring to be sealed.

In the following further examples the artefact consisted of porous carbon and was treated in the apparatus shown in the accompanying drawing.

*Example VI*

A cylindrical artefact of porous carbon 25 cm. long and about 10 mm. thick with an external diameter of 33 mm., was formed by the following method:

A thin cardboard tube of about 16 mm. internal diameter was wrapped with wet cotton wool which was bound tightly to the cardboard with string. (A denser layer was obtained in this way than by the use of dry cotton wool.) The tube with cotton wool thereon was dried in an oven at 90° C., fitted concentrically around a graphite rod of 13 mm. diameter, and then baked to 900° C. in an argon atmosphere. The diameter of the rode was so chosen that the cardboard tube with cotton wool thereon shrank onto the surface of the rod, but did not crack subsequently, during carbonisation. The assembly of graphite rod, carbonised cardboard and carbonised cotton wool was machined to an outside diameter of 33 mm. and a porous artefact consisting of about 9 mm. thickness derived from the cotton wool and about 1 mm. derived from the cardboard was then easily separated from the graphite rod and mounted on a tubular graphite element, identical with that used in Examples I, III and IV, by means of an insulating silica collar at each end of the artefact. The assembly was placed in a brass vessel as shown in the accompanying drawing and evacuated to remove air. Argon was admitted to the annular space (2.5 mm. wide) between the element and the artefact. Propane at atmospheric pressure was then admitted to the vessel outside the artefact, and power was supplied to the element to raise its centre temperature to 840° C. This required about 200 watts. Propane was fed in at the rate of 100 cc. per second and argon was passed continuously through the space between the element and the artefact, while the power was raised at the rate of 20 watts every 15 minutes for 7 hours, and 25 watts every 15 minutes for a further 14 hours, thus ensuring that the boundary zone did not advance too rapidly. The final centre temperature was about 1610° C. and the maximum power at the end of this period was 2.15 kilowatts. After cooling as in Example I, the artefact was found to be fully impregnated throughout its thickness and to have a permeability of $2 \times 10^{-10}$ cm.$^2$/sec. The impregnated artefact was then graphitised by heating it in a graphitising furnace to 2700° C., the heating rate between 800° and 1300° C. being restricted to 20° C./hr.

The graphitised product of Example V was machined out to remove the inner layer derived from the cardboard tube and was then found to have a mean density of 1.78 gm./cc. and a permeability of $4 \times 10^{-8}$ cm.$^2$/sec.

*Example VII*

An artefact of porous carbon was formed and treated as in Example VI, except that ethylene was used as the hydrocarbon gas instead of propane. The impregnated artefact was found to have a permeability of less than $10^{-12}$ cm.$^2$/sec. before graphitisation.

The product of Example VII could not be graphitised successfully, however, since spalling of the outer layers occurred. The permeability of the remainder of the artefact was found to have risen to $2 \times 10^{-8}$ cm.$^2$/sec.

Example VIII

An artefact of porous carbon was formed as in Example VI, except that the cotton wool was wrapped dry instead of wet. The assembly of the artefact on the graphite heating element was placed in the vessel and argon admitted as in Example VI. Purified methane, consisting of 89% methane and the remainder mainly nitrogen and carbon monoxide, but containing no oxidising gases, was admitted at atmospheric pressure and power supplied to the element to raise its centre temperature to 990° C., requiring 200 watts. Purified methane was then fed in at 100 cc./sec. and the power raised at the rate of 20 watts every 10 minutes for 5 hours, and 25 watts every 10 minutes for a further 7½ hours. The maximum power at the end of this period was 1.95 kilowatts. The impregnated artefact was successfully graphitised by heating to 2700° C., the heating rate being 100° C./h. between 800° and 1400° C. After machining to an outside diameter of 27 mm. and inside diameter of 17.5 mm., it was found to have a density of 1.55 gm./cc. and a permeability of $3 \times 10^{-10}$ cm.$^2$/sec., which did not increase on machining a further 1.5 mm. off the outside diameter.

Example IX

An artefact of porous carbon was formed as in Example VI, except that baking was carried out at 1500° C., and treated as in Example VIII, except that the power rise was continued at 25 watts every 10 minutes for 10 hours, the maximum power being 2.3 kilowatts. Before graphitising the impregnated artefact had a density of 1.66 gm./cc. and a permeability $4 \times 10^{-10}$ cm.$^2$/sec., which after graphitising only increased to $5 \times 10^{-10}$ cm.$^2$/sec.

Example X

An impregnated artefact produced as in Example VIII, but using a mixture of 75% purified methane and 25% hydrogen, had a permeability of $3 \times 10^{-10}$ cm.$^2$/sec. after graphitising.

It is clear from the above examples that, although the highest densities of impregnated material can be produced by using higher hydrocarbons, such as propane or benzene, the lowest permeabilities attainable after graphitising are produced by the use of methane as the hydrocarbon gas.

The permeability to gases of the carbon-impregnated artefacts produced by the method of the invention are in the range of $10^{-8}$ to $10^{-12}$ cm.$^2$/sec. This may be compared with the corresponding values for commercially available graphites, which lie in the range from 1 cm.$^2$/sec. to $10^{-2}$ cm.$^2$/sec., and those for graphites treated by furfuryl alcohol impregnation and subsequent carbonisation of the furfuryl alcohol resin therein, which lie in the range from $10^{-4}$ to $10^{-8}$ cm.$^2$/sec.

We claim:

1. A method of producing a carbon impregnated artefact, comprising the steps of forming a body having an open porosity of at least 60% by volume and low thermal conductivity, the body being of a material selected from the group consisting of silica, alumina and carbon; placing the body in an atmosphere of hydrocarbon gas, the gas permeating the body; heating a fixed first zone of the body to a first temperature at which carbon from the hydrocarbon gas permeating the body is deposited in the first zone until the first zone is fully impregnated; and then further heating the first zone to progressively raise the temperature of the impregnated first zone at a controlled rate and create a moving boundary zone along the body in which the temperature of the moving boundary is the said first temperature wherein carbon is deposited at the moving boundary from the permeating hydrocarbon gas, the rate of rise of temperature of said first zone being controlled such that the boundary zone in its movement along the body is fully impregnated.

2. A method according to claim 1, in which the artefact of high open porosity and low thermal conductivity consists of a carbon mass of high open porosity.

3. A method according to claim 2, in which the carbon mass consists of a mass of carbon black particles.

4. A method according to claim 3, in which the mass of carbon black particles is first compacted into a coherent mass and granulated.

5. A method according to claim 2, in which the carbon mass consists of carbonised cellulose fibrous material.

6. A method of producing a carbon impregnated nuclear fuel element comprising the steps of forming a body having an open porosity in excess of 60% by volume and low thermal conductivity, such body consisting essentially of a mixture of carbon particles and nuclear fuel material particles; placing the body in an atmosphere of hydrocarbon gas to permeate the body with the hydrocarbon gas; heating a fixed first zone of the body to a first temperature at which carbon from the hydrocarbon gas permeating the body is deposited in the first zone until the first zone is fully impregnated; and thereafter heating the first zone to progressively raise the temperature of the impregnated first zone at a controlled rate and create a boundary zone moving along the body in which the temperature of the moving boundary zone is the said first temperature wherein carbon is deposited at the moving boundary zone from the permeating hydrocarbon gas, the rate of rise of temperature of said first zone being controlled such that the boundary zone in its movement along the body is fully impregnated.

7. A method according to claim 6, in which the particles of nuclear fuel material have a coating of carbon thereon.

8. A method according to claim 6, in which the mixture is first compacted into a coherent mass and granulated.

9. A method of producing a carbon impregnated nuclear fuel element comprising the steps of forming a body having an open porosity in excess of 60% by volume and low thermal conductivity, such body consisting essentially of carbonized cellulose fibrous material having a nuclear fuel material incorporated therein; placing the body in an atmosphere of hydrocarbon gas to permeate the body with the hydrocarbon gas; heating a fixed first zone of the body to a temperature at which carbon from the hydrocarbon gas permeating the body is deposited in the first zone until the first zone is fully impregnated; and thereafter further heating the first zone to progressively raise the temperature of the impregnated first zone at a controlled rate and create a moving boundary zone in which the temperature of the moving boundary zone is the said first temperature wherein carbon is deposited in the boundary zone from the permeating hydrocarbon gas, the rate of rise of temperature of said first zone being controlled such that the boundary zone is fully impregnated during its movement.

10. A method of producing a carbon impregnated artefact comprising the steps of forming a carbon body having an open porosity in excess of 60% by volume and low thermal conductivity and further having opposed first and second surfaces; continuously supplying hydrocarbon gas to the second surface to permeate the body; heating the first surface to a first temperature sufficient to cause deposition of carbon from the hydrocarbon gas in a thin zone of the body adjacent to said first surface at a rate at which hydrocarbon gas can reach said thin zone, the first temperature being insufficient to cause substantial deposition of carbon elsewhere in the body; and thereafter further heating the first surface to raise the temperature of said first surface at a controlled rate sufficient to cause carbon deposition in a zone moving from said thin zone towards said second surface, the rate of rise of the temperature of the first surface being such that the temperature of the moving zone is the first temperature and the hydrocarbon gas can reach the moving zone and decompose therein to substantially fill all the pores in the moving zone with carbon.

11. A method according to claim 10, in which the artefact is in the form of a tube, the inner surface of the tube is heated to the first temperature, and the hydrocarbon gas is supplied to the outer surface of the tube.

12. A method according to claim 11, in which the outer surface of the tube is artificially cooled by cooling means surrounding the artefact.

13. A method according to claim 11, in which the inner surface of the tube is heated by an electrical current-carrying element passing concentrically through the artefact.

14. A method according to claim 13 in which the element is in direct contact with the inner surface of the artefact.

15. A method according to claim 13, in which the element is spaced from the inner surface of the artefact.

16. A method according to claim 10, in which the artefact is in the form of a tube, the outer surface of the tube is heated to the first temperature, and the hydrocarbon gas is supplied to the inner surface of the tube.

17. A method according to claim 13, in which the inner surface of the tube is cooled by fluid passing through a concentric inner tube.

References Cited by the Examiner
UNITED STATES PATENTS

| | | | |
|---|---|---|---|
| 2,392,682 | 1/46 | Marek | 117—46 |
| 2,783,164 | 2/57 | Hill | 117—107 |
| 2,817,605 | 12/57 | Sanz et al. | 117—46 |
| 2,880,117 | 3/59 | Hanlet | 117—106 |
| 2,922,722 | 1/60 | Hutcheon | 117—46 |
| 2,990,351 | 6/61 | Sanz et al. | 176—71 |

FOREIGN PATENTS

| | | |
|---|---|---|
| 127,394 | 3/48 | Australia. |
| 612,742 | 11/48 | Great Britain. |
| 830,378 | 3/60 | Great Britain. |

CARL D. QUARFORTH, *Primary Examiner.*

OSCAR R. VERTIZ, *Examiner.*